United States Patent [19]

Radke et al.

[11] Patent Number: 4,692,930
[45] Date of Patent: Sep. 8, 1987

[54] FLOOR OF ELECTRICALLY HEATED MELTING FURNACE, PARTICULARLY A DIRECT CURRENT FURNACE

[75] Inventors: Dietrich Radke, Ratingen; Peter Meger, Willich; Heinz Zörcher, Siegen, all of Fed. Rep. of Germany

[73] Assignee: Fried. Krupp Gesellschaft mit beschränkter Haftung, Essen, Fed. Rep. of Germany

[21] Appl. No.: 912,913

[22] Filed: Sep. 29, 1986

[30] Foreign Application Priority Data

Sep. 28, 1985 [DE] Fed. Rep. of Germany ....... 3534750

[51] Int. Cl.⁴ .............................................. F27D 1/04
[52] U.S. Cl. .................................................. 373/72
[58] Field of Search ................. 373/72, 108; 110/323, 110/326, 338, 340; 165/9.4; 264/30; 432/252

[56] References Cited

U.S. PATENT DOCUMENTS

| 4,228,314 | 10/1980 | Stenkvist | 373/72 |
| 4,435,813 | 3/1984 | Stenkvist | 373/72 |
| 4,541,099 | 9/1985 | Rappinger et al. | 373/72 |

Primary Examiner—Roy N. Envall, Jr.
Attorney, Agent, or Firm—Spencer & Frank

[57] ABSTRACT

An electrically heated melting furnace, preferably a direct current electric arc furnace, having a floor provided with a lining of refractory material and with an electrode comprised of a plurality of electrically conductive paths formed of an electrically conductive material which extends through the lining of refractory material from the inner floor surface toward the exterior, wherein the service life of the lining is improved in that the electrically conductive paths are composed of layers of at least one high melting point nonmetallic material which are connected with the refractory material, and which have a thickness of at most 5 mm.

17 Claims, 5 Drawing Figures

FLOOR OF ELECTRICALLY HEATED MELTING FURNACE, PARTICULARLY A DIRECT CURRENT FURNACE

BACKGROUND OF THE INVENTION

The present invention relates to an electrically heated melting furnace, particularly a direct current furnace, and preferably to a direct current electric arc furnace provided with a plurality of electrically conductive paths which serve as an electrode and which extend through the refractory material lining of the floor of the furnace.

One generally existing problem in prior art direct current furnaces, is that of insufficient durability of the furnace floor or hearth bottom in the region in which electrically conductive material is disposed to serve as electrodes. Various floor configurations for such direct current furnaces are known in which metal or graphite plates or rods are disposed as current conductors in the furnace lining made of a refractory material. However, these plates or rods are dissolved by the metal melt or may be washed out with it and may then even result in breaks in the furnace.

The graphite component of carbon magnesite blocks or bricks give them a certain electrical conductivity and, for that reason, they have been suggested for use as the conductive material for a floor electrode. However, since the electrical conductivity of such blocks is too low, additional graphite conductors must be used to assure sufficient passage of current. Such additional conduction present the further problem that if these additional conductors contact the metal bath, they are subjected to considerable wear. Moreover, with the high thermal stresses occurring in such a floor, these additional conductors may also be easily crushed, thus interrupting the flow of current at the breaks. Additionally, in certain modes of operating a direct current furnace, it frequently happens that the carbon magnesite blocks wear out very quickly because their graphite components decompose. Finally, the use of carbon magnesite blocks has the additional drawback that their good thermal conductivity causes considerable heat losses during operation of the furnace.

SUMMARY OF THE INVENTION

It is an object of the invention to provide a floor of a direct current furnace of the above-mentioned type such that the durability of the floor is improved while the passage of sufficient current is assured.

The above object is accomplished according to the invention in that in an electrically heated melting furnace, particularly a direct current furnace, having a floor provided with a lining of refractory material and with an electrode comprised of a plurality of electrically conductive paths which extend through the lining of refractory material starting from the inner surface of the floor and continuing toward the exterior, the conductive paths are composed of layers of at least one high melting point, electrically conductive, nonmetallic material which are connected with the refractory material, and which have a thickness of at most 5 mm. The melting point of the electrically conductive nonmetallic material must be sufficiently high to withstand the temperatures existing in the furnace.

Primarily, the present invention has the advantage that the high melting point, nonmetallic material can be combined with the refractory material even before the floor is shaped and independently of whether the floor of the direct current furnace is composed of blocks or is produced by the introduction of a mass that is tamped down. The layers of nonmetallic material are kept so thin, preferably below 2 mm, that their being washed away by the melt in the furnace is reliably prevented.

All suitable compounds can be used as the conductive, high melting point, nonmetallic material if they have the stated characteristics. In addition to the preferred carbon containing materials, borides, silicides and nitrides can also be used. Of the carbon containing materials, graphite is particularly suitable, with the graphite preferably being applied to the surface of blocks made of a refractory material either directly or, if necessary, through the intermediary of an inert intermediate layer.

Particularly advantageous is the use of metal carbides, such as chromium carbide, tantalum carbide, molybdenum carbide, tungsten carbide, vanadium carbide and particularly titanium carbide. These materials and also borides, silicides and nitrides can be applied as extremely thin coatings to the particles of the refractory material before shaping the latter into the furnace lining. The coatings on the particles then form an electrically conductive network which is protected against any "premature" wear. The floor material produced in this manner can be further processed into shaped blocks or can be introduced into the furnace as a mass that must be tamped down. Titanium carbide, as well as graphite and the other suitable materials, can of course also be applied to the surfaces of the blocks of refractory material of which the floor is composed. It may be necessary in this connection to place an inert intermediate layer between the refractory material and the layers if, under certain operating conditions, a reaction is to be expected between the material of the layers and the refractory material. This is particularly applicable for refractory materials that are rich in carbon. Aluminum oxide is primarily considered for the inert intermediate layer.

In addition to placing the layers of non-metallic material on the surfaces of the refractory blocks, the layers may also be arranged exclusively or additionally inside the blocks in the direction of current flow, e.g. in the form of laminae or as a grid pattern. The blocks are then manufactured accordingly. The important factor for all embodiments of the floor according to the invention is that the number and thickness of the layers is selected in such a manner that the required passage of current is realized. This applies of course also in the case of the coated particles of the refractory starting material. With the use of blocks, a number of possible variations exist for the arrangement of the layers in or on the surfaces of these blocks. For example, it may be sufficient to provide only part of the blocks, for example half of the blocks, with the electrically conductive layers.

The invention can be used for all electrically heated furnaces whose floors operate as the electrode, with direct current furnaces. In particular, direct current electric arc furnaces in which the floor generally functions as the anode are preferred. The invention can be used to particular advantage in furnaces in which the innermost portion of the refractory lining is used as a so-called wear-away lining, i.e. where part of the refractory lining is in contact with the melt.

The lower limit for the layer thickness of the electrically conductive material lies at about 2 $\mu$m for a layer which is applied onto or within a block, and at about 0.001 μm for a particle coating. Advantageously the layers are kept as thin as possible.

As indicated above, the upper limit for the layer thickness of the electrically conductive material coating according to the invention lies at 5 mm and preferably at 2 mm. In the case of coated refractory particles, the layer thickness of the coating will normally be much less and essentially depends on the grain size of the refractory material, with a maximum layer thickness of about one half the grain size diameter being possible. However, since the grain size normally does not exceed 5 mm, this makes the absolute maximum coating layer thickness for particles about 2.5 mm, which would be an exceptionally large, although possible, layer thickness for particles.

BRIEF DESCRIPTION OF THE DRAWINGS

The present invention will now be described in greater detail below with reference to several embodiments which are illustrated schematically in the drawing.

DETAILED DESCRIPTION OF THE PREFERRED EMBODIMENT

Figure 1:
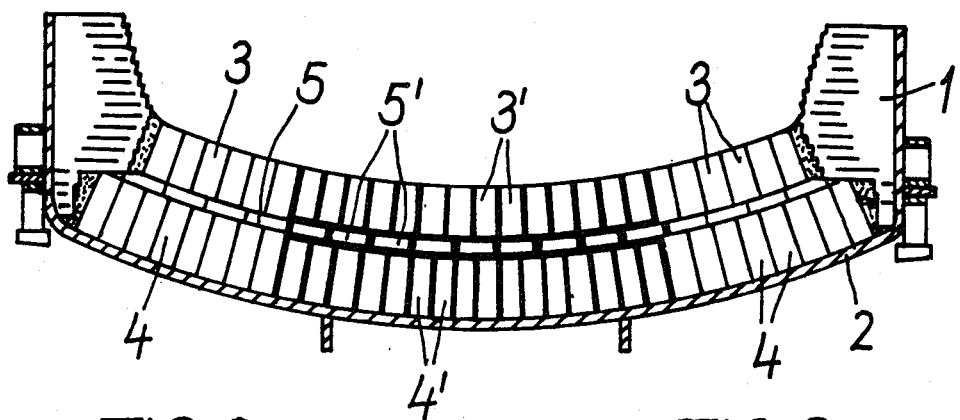
FIG. 1 is a vertical sectional view of the floor region of a direct current electric arc furnace provided with layers of material according to the invention.

Referring now to FIG. 1, there is shown the lower region of a direct current electric arc furnace having a cylindrical side wall 1 with a downwardly curved metal floor sheet 2 extending between the cylindrical side wall 1 and with the interior of the metal sheet 2 being lined with bricks or blocks of a refractory material. The lining includes an inner layer of juxtaposed, contiguous blocks or bricks 3 which form the so-called wear-away lining. The metal floor sheet 2 is bordered by a further layer of high quality fireproof clay blocks or bricks 4 arranged next to one another in the same manner. The bricks 4 serve only to prevent the escape of heat, i.e. they do not come in contact with the melt as do the bricks 3 of the inner wear-away lining. Between the layer of bricks 3 of the wear-away lining and layer of bricks 4 of the permanent lining, there is disposed a significantly thinner layer of correspondingly flat bricks or blocks 5 made of the same material as the bricks 3 of the wear-away lining and constituting an interposed safety zone. Preferably, the blocks 3 and 5 of the wear-away lining and of the safety zone respectively are made of magnesite.

As shown in FIG. 1, the blocks or bricks of refractory material inserted in the center region of the floor are coated with graphite on all their surfaces, as indicated by the heavy lines. The graphite is applied with the use of a suitable binder, such as pitch coke or oil coke, to bricks 3', 4' and 5', i.e. the bricks of the wear-away lining, the permanent lining and the intermediate layer in the respective center regions, before the floor lining is installed. The graphite layer thickness in each case is 1.5 mm. As shown, bricks or blocks 3' and 4' are placed on the floor in an upright manner and have the shape of a square column. Blocks or bricks 5' of the safety zone, however, extend essentially parallel to metal floor sheet 2. The same considerations for the selection of the refractory material apply for the brick or blocks 3', 4' and 5' of the central region of the floor, which forms the electrode, and for the bricks or blocks 3, 4 and 5 of the adjacent edge regions of the floor.

Figure 2:
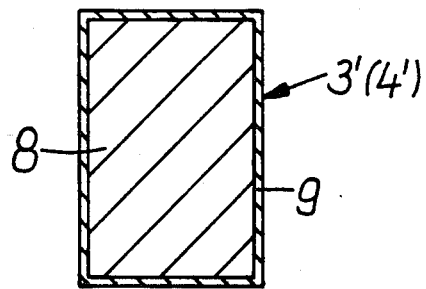
FIGS. 2 and 3 are sectional views of two blocks coated with different materials for the refractory lining of the furnace floor of FIG. 1 as seen in the direction of current flow.
Figure 3:
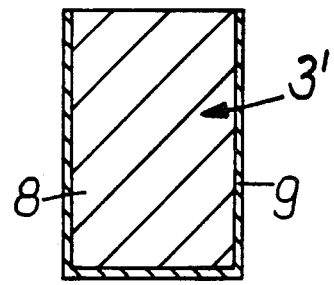

FIG. 2 shows an embodiment of bricks or blocks 3' or 4' for the wear-away and permanent linings respectively for the furnace floor of FIG. 1. As shown, each brick 3' or 4' includes a brick or block shaped blank 8 of refractory material which is coated on all exterior surfaces with a layer 9 of an electrically conductive, high melting point, non-metallic substance according to the invention. By coating the upper and under surfaces of each block in addition to the side surfaces, good contacts for the passage of current are realized in the regions where the blocks abut one another in the direction of current passage or flow, i.e. essentially transversely to the extent of the floor. As can be seen in FIG. 1 from the heavy lines in the central region, coating the blocks or bricks 3', 4' and 5' in this manner results in the coatings forming a continuous current path between the interior and exterior of the floor. As shown in FIG. 3, the conductive coating may be omitted from the surface of blocks 3' of the wear-away lining facing the melt, if this results in savings. With a lining arrangement as shown in FIG. 1, the bricks 5' are preferably coated on all surfaces.

Figure 4:
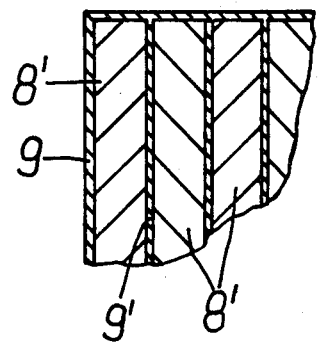
FIG. 4 is a partial sectional view of a refractory block provided with conductive material layers according to another embodiment of the invention as seen transversely to the direction of current flow.

Instead of or in addition to coating the outer surfaces of the refractory material blocks, the electrically conductive layers may be arranged in laminar form in a block of refractory material as shown in FIG. 4. With this latter arrangement, a larger number of electrically conductive layers 9' is produced in the direction of current passage or flow so that a smaller layer thickness for the electrically conductive material is required. In such or similar arrangement of layers 9' within a block (which in this case is a composite block formed of a plurality of coated blocks 8' of smaller size), the coating 9 of the outer surfaces of such a block or brick may also be omitted. However, it is advisable to leave the coating 9 on those outer surfaces which abut one another in the direction of current flow.

In the case where an inert intermediate layer is disposed between the refractory material 8 or 8' and the respectively adjacent electrically conductive layer 9 or 9', the material in this intermediate layer may advantageously be selected so that thermal stresses between the refractory material and the electrically conductive layer are reduced. For the same purpose, however, and in a known manner, suitable additives may also be added to the refractory material, or the porosity of the refractory material may be adjusted, so as to realize a matching coefficient of thermal expansion.

One example of the manufacture of a refractory block or brick provided with layers of graphite as the electrically conductive material will be described below.

A mass composed of graphite with additives of anthracite and pitch coke as well as a binder is introduced into a press mold together with a block blank or refractory material so that, after pressing, the surface of the refractory block blank is coated with graphite. Then the coated block is fired under exclusion of air or in a highly reducing atmosphere. In order to prevent stresses in the material, the temperature is raised very slowly (about 2° to 4° C./h) until it reaches a final firing temperature of about 1350° C. After firing, during which the binder material carbonizes, the block has on its surface a stable, electrically conductive layer of the desired thickness. If such a block is also to have an electrically conductive layer in its interior, this is considered before pressing, and during manufacture of the blanks. The firing treatment does not change in this case. The cross section of such a block is, for example, rectangular, with edge lengths of 100 mm×120 mm; its height is 250 mm. To adapt itself to the curvature of the furnace floor, the block or brick is tapered in a known manner in its longitudinal extent.

One example of a substance or mass which may be used to form the graphite coating is composed of 15 to 25% graphite (e.g. so-called electrode breakage), 25 to 35% anthracite, 10 to 20% pitch coke and 30% binder in the form of tar and/or pitch. A further example of a substance that can be used involves introducing pitch coke, petroleum coke and binder (tar and/or pitch), each at about one third (30% to 40%) into the press mold. After firing, the desired graphite layer results from this mass.

When metal carbides, particularly titanium carbides, are used as the material for the electrically conductive layers, substantially thinner layer thicknesses can be realized. For example, titanium carbide is applied in a layer thickness of 40 $\mu$m to a refined, carbon containing block of magnesite to which about 5% pitch have been added. If a chromium magnesite block is used, it is necessary to employ an intermediate layer containing an insulating, aluminum oxide additive. This intermediate layer has a thickness of about 0.2 mm and contains no chromite. Preferably the aluminum oxide percentage of the intermediate layer increases toward the titanium carbide layer.

Particularly thin titanium carbide layers can be obtained by means of vapor deposition onto the surfaces of the refractory material. To do this, titanium chloride and methane are conducted onto the surface of the blank at a temperature from 800° to 1200° C., with the surface possibly being already provided with an inert intermediate layer.

Figure 5:
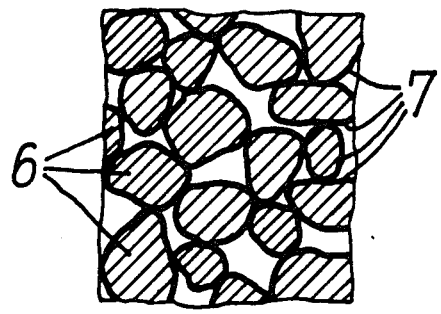
FIG. 5 is a greatly enlarged sectional view of a portion of a furnace floor made of a tamped down mass of coated refractory material particles according to the invention.

As indicated above, instead of forming the lining of the furnace from rows of bricks or blocks as shown in FIG. 1, the lining can be formed from a tamped mass of refractory material particles. According to the invention, the individual particles of refractory material may be coated with the electrically conductive, high melting temperature, non-metallic material so as to form the floor electrode. FIG. 5 shows how the conductive coatings 7 applied to individual particles 6 of refractory material, and thus forming coated particles 6, form a contiguous network for the passage of current. As shown in FIG. 5, the electrically conductive layers 7 lie on top of one another at the contact faces of the particles 6 and thus form a chain of interconnected conductors which extends through the furnace floor lining. For a total resistance in the floor of about 0.15 ×10$^{-3}$ Ohm, the layer thickness 7 lies between 0.1 and 1 $\mu$m if the average grain size of the refractory material particles 6 lies between about 0.1 and 5 mm.

The coatings may be applied by methods well known in the art. For example, one coating method which can be used is disclosed in U.S. Pat. No. 2,962,388 issued Nov. 29, 1986 to W. Rupport et al.

The present disclosure relates to the subject matter disclosed in Federal Republic of Germany Patent Application No. P 35 34 750.3 of Sept. 28, 1985, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In an electrically heated melting furnace, particularly a direct current furnace, having a floor provided with a lining of refractory material and with an electrode comprised of a plurality of electrically conductive paths which extend through said lining of refractory material starting from the inner surface of the floor and continuing toward the exterior; the improvement wherein said conductive paths are composed of layers of at least one high melting point, electrically conductive, nonmetallic material which are connected with said refractory material, and which have a thickness of at most 5 mm.

2. A furnace as defined in claim 1, wherein said layers have a thickness of at most 2 mm.

3. A furnace as defined in claim 1 wherein said layers are composed of carbon containing material.

4. A furnace as defined in claim 3, wherein said layer material is graphite.

5. A furnace as defined in claim 3, wherein said layer material is a metal carbide.

6. A furnace as defined in claim 5, wherein said layer material is titanium carbide.

7. A furnace as defined in claim 1 wherein: said lining is composed of blocks of refractory material; and said layers are connected with said blocks as a component thereof.

8. A furnace as defined in claim 7 wherein said layers are connected with said blocks via the intermediary of an inert intermediate layer.

9. A furnace as defined in claim 7, wherein said layers are coatings on at least some of the outer surfaces of said blocks.

10. A furnace as defined in claim 9 wherein at least the said outer surfaces of said blocks which extend transversely to the extent of said floor are provided with said coatings.

11. A furnace as defined in claim 10 wherein: said blocks are arranged in a plurality of rows; and the surfaces of said blocks which abut a block of a different row are additionally provided with said coatings.

12. A furnace as defined in claim 9, wherein said coating are connected with said outer surfaces of said blocks by means of a suitable binder.

13. A furnace as defined in claim 7, wherein said layers are pressed onto said blocks and are strengthened by means of a subsequent heat treatment.

14. A furnace as defined in claim 7 wherein said layers extend at least through said blocks of refractory material in a direction transversely to the direction of said floor.

15. A furnace as defined in claim 14 wherein: said lining includes a plurality of rows of said blocks of refractory material; and wherein said layers additionally coat those outer surfaces of said blocks which abut one another in the direction of current flow.

16. A furnace as defined in claim 1 wherein: said lining is composed of a shaped mass of particles of said refractory material; and said layers are coatings applied to said particles of refractory material before they are shaped to form said lining.

17. A furnace as defined in claim 16 wherein said layer material is a metal carbide.

* * * * *